(12) United States Patent
Robison et al.

(10) Patent No.: US 9,400,878 B2
(45) Date of Patent: Jul. 26, 2016

(54) CONTEXT ANALYSIS AT AN INFORMATION HANDLING SYSTEM TO MANAGE AUTHENTICATION CYCLES

(71) Applicant: Dell Products L.P., Round Rock, TX (US)

(72) Inventors: Charles D. Robison, Buford, GA (US); Liam B. Quinn, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/075,151

(22) Filed: Nov. 8, 2013

(65) Prior Publication Data

US 2015/0135298 A1    May 14, 2015

(51) Int. Cl.
| | |
|---|---|
| *G06F 21/81* | (2013.01) |
| *G06F 21/31* | (2013.01) |
| *H04L 29/06* | (2006.01) |
| *H04W 4/02* | (2009.01) |
| *H04W 12/02* | (2009.01) |

(52) U.S. Cl.
CPC ............ *G06F 21/31* (2013.01); *H04L 63/0492* (2013.01); *H04L 63/0853* (2013.01); *H04W 4/02* (2013.01); *H04W 12/02* (2013.01); *G06F 2221/2137* (2013.01); *G06F 2221/2139* (2013.01)

(58) Field of Classification Search
None
See application file for complete search history.

(56) References Cited

U.S. PATENT DOCUMENTS

| | | | | |
|---|---|---|---|---|
| 6,813,491 | B1 * | 11/2004 | McKinney | H04M 1/673 455/414.1 |
| 8,646,060 | B1 | 2/2014 | Ben Ayed | |
| 2008/0083037 | A1 * | 4/2008 | Kruse | G06F 21/88 726/27 |
| 2009/0085760 | A1 * | 4/2009 | Lee | G08B 13/1418 340/669 |
| 2011/0187532 | A1 | 8/2011 | Edelstein et al. | |
| 2012/0046012 | A1 | 2/2012 | Forutanpour et al. | |
| 2012/0064948 | A1 * | 3/2012 | Lee et al. | 455/566 |
| 2012/0079110 | A1 | 3/2012 | Brown et al. | |
| 2012/0182420 | A1 * | 7/2012 | Grokop | H04W 4/001 348/143 |
| 2012/0235790 | A1 * | 9/2012 | Zhao | G06F 21/32 340/5.83 |
| 2012/0254941 | A1 * | 10/2012 | Levien | G06F 21/00 726/3 |
| 2013/0031595 | A1 * | 1/2013 | Nevstruev | G06F 21/6245 726/1 |
| 2013/0260717 | A1 * | 10/2013 | Miyaki | 455/411 |
| 2013/0340073 | A1 * | 12/2013 | Bhaskaran | G06F 21/34 726/19 |
| 2014/0123273 | A1 * | 5/2014 | Matus | 726/17 |
| 2014/0208417 | A1 | 7/2014 | Robison | |
| 2015/0169858 | A1 | 6/2015 | Tg | |

OTHER PUBLICATIONS

Lo et al., U.S. Appl. No. 14/053,323, filed Oct. 14, 2013, entitled Improved Supervisory Controls Using Contextual Awareness.
R. Cardone et al., U.S. Appl. No. 14/014,662, filed Aug. 30, 2013, entitled System and Method of Secure Logon for Shared Devices.

\* cited by examiner

*Primary Examiner* — David Pearson
(74) *Attorney, Agent, or Firm* — Terrile, Cannatti, Chambers & Holland, LLP; Robert W. Holland

(57) ABSTRACT

Context captured with sensors of an information handling system is applied to selectively lock access to currently unlocked information, with conditions for locking access based upon the context. Nervous states enforce locking of selected information based upon the confidence of the security of the information under sensed external conditions. Increased sensitivity for locking access includes reduced timeouts to a lock command, increased response to sensed conditions, and more rapid response where unlocked access is to sensitive information.

20 Claims, 6 Drawing Sheets

CONTEXT ANALYSIS AT AN INFORMATION HANDLING SYSTEM TO MANAGE AUTHENTICATION CYCLES

CROSS REFERENCE TO RELATED APPLICATIONS

U.S. patent application Ser. No. 14/075,135, entitled "Context Analysis At An Information Handling System To Manage Authentication Cycles" by inventors Charles D. Robison, Liam B. Quinn, Rocco Ancona, and Roman Joel Pacheco, filed Nov. 8, 2013, describes exemplary methods and systems and is incorporated by reference in its entirety.

U.S. patent application Ser. No. 14/075,165, entitled "Context Analysis At An Information Handling System To Manage Authentication Cycles" by inventors Charles D. Robison, Liam B. Quinn, and Rocco Ancona, filed Nov. 8, 2013, describes exemplary methods and systems and is incorporated by reference in its entirety.

BACKGROUND OF THE INVENTION

1. Field of the Invention

The present invention relates in general to the field of information handling system security, and more particularly to context analysis at information handling system to manage authentication cycles.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often store sensitive information, such as information about finances, trade secrets, health, family, etc., that is protected by various security arrangements. Often, sensitive information is password protected to prevent unauthorized access. Password protection starts at a hardware level, such as a BIOS password required to start-up an information handling system, and extends to individual files and applications loaded on an information handling system, such as password protected financial applications. Additional passwords are typically used to protect network-accessible items, such as network storage at a remote server, financial websites and VPN accesses. Password protection provides "what you know" security by forcing an end user to input a unique code to obtain access to information or functions. Another type of protection is "what you have" protection, which depends upon hardware and/or software "tokens" to obtain access to information. For example, a hardware device on an information handling system generates passwords to provide access to information or functions protected by a mated hardware device at an information handling system that supports the information or functions. When an end user saves passwords on an information handling system, such as with saved logins for websites, the information handling system itself essentially becomes a hardware token to access the websites. A "where you are" protection restricts information or function access based upon the location of the information handling system, such as a location within an enterprise that has restricted access. Another type of protection is "who you are" security that measures biometrics, such as a fingerprint of an end user, to restrict access to information or functions.

Generally, information security focuses on authentication of an end user and assumes that the end user has authorization to access information once authentication is provided. Typically, once an end user provides authentication, the information handling system provides free access to information based upon the authentication as long as the end user actively uses the information handling system. If an end user steps away from the information handling system, the end user may secure the information handling system from access in a number of different ways. One way is to simply power off the system until the end user returns, however, this can introduce inconvenience in that the end user must remember to power down the system and wait to restart the system. Another way is to lock access to the information handling system while the end user steps away, such as with a secure operating system or BIOS based screen saver or blank screen. If an end user is using a clamshell portable system, closing the lid will typically lock the system by causing entry to an S3 standby state that requires a password to recover. Many newer tablet systems do not have a lid to close to initiate a standby state, although some tablets include a similar magnetic sensing option with supporting accessories, such as carrying cases that simulate a clamshell housing and keyboard. Generally, most information handling systems will enter a standby state or its equivalent after a certain amount of time has passed in order to conserve power, and, as a side result, secure the system with a passcode. A typical timeout period for entry to a secure state is 15 minutes of idle time at the information handling system.

Information handling systems have shrunk in size and increased in processing capabilities so that the smartphones available today have the processing capabilities of desktops of the recent past. Although this has provided increased convenience to end users, it has also made portable systems more susceptible to theft and the consequences of theft more serious. For example, smartphones and tablets often include applications designed to provide an end user with secure access to information, such as financial services and enterprise trade secrets. Further, smartphones and tablets often include web browsers with saved passwords that provide access to sensitive information, such as bank accounts, brokerage accounts, medical records, etc. In addition, smartphones and tablets typically include access to email accounts that include emails with sensitive information. If an end user leaves a portable information handling system in an unsecure location and the system is stolen before a power state timeout, then the thief may have access to all of the information available to the end user. For instance, if a fifteen minute timeout exists and an end user steps away to get a coffee when the system is stolen, the thief may have ten or more minutes to begin interacting with the system so that the end user's authentication will stay "alive." Once the thief has access, he can keep authentication alive by making inconsequential inputs at the system until he can secret the system away to another location. As one example, a thief can establish a login through Windows 8 Live ID single sign-on and, via LiveID credentials, can obtain skydrive and Hotmail accounts that are both authenticated and unlocked. In many typical scenarios, only a fifteen minute timeout separates a thief from extensive access to the data available through an authenticated information handling system.

SUMMARY OF THE INVENTION

Therefore a need has arisen for a system and method which provides a robust and intelligent context analysis that protects authenticated systems with various levels of nervousness based upon automated detection of a user's presence and interaction relative to a portable information handling system.

In accordance with the present invention, a system and method are provided which substantially reduce the disadvantages and problems associated with previous methods and systems for protecting access to information through an information handling system. Access to unlocked information at an information handling system is selectively locked based upon context sensed at the information handling system with sensors integrated in the information handling system. Nervous states enforce system security by locking selected information and/or functions at selective conditions based upon the confidence of security associated with a sensed context.

More specifically, a context engine executing on a security processor of an information handling system monitors conditions sensed by sensors to determine a context. Sensors include devices that determine the proximity of a user to an information handling system and the location of the information handling system. A nervous state engine executing on the security processor applies the context to determine conditions that will lock selected access to the information handling system. For example, the nervous state engine will enforce a relatively lengthy timeout to lock in a safe location, such as an enterprise or home office, and a shorter timeout in an unknown location, such as at a public hot spot. As context changes, the nervous state engine adjusts conditions for locking access to adapt to the confidence in the security of the information handling system. Access may be selectively locked based upon the type of information or type of application in use at an information handling system. For example, more sensitive information, such as financial information of secure HTTPS and VPN connectivity, may be locked sooner than access to less sensitive information. Further, conditions met at a nervous state engine may transition to other nervous states with other conditions so that security adapts to likely use cases of the information handling system.

The present invention provides a number of important technical advantages. One example of an important technical advantage is that user authorization to access information after authentication is provided is securely and intelligently established by contextual presence and status of the user. A fusion of hard and soft sensors intelligently determine context at an information handling system to proceed between full access at the system, through various nervous states and to system lock based upon the context. For example, hard sensors include mechanical devices that detect a context at a housing, such as a lid position, docking station, power adapter, hot plug, etc . . . , and soft sensors include electronic devices that detect an external condition, such as a GPS receiver, accelerometer, wireless transceiver, etc . . . A user has increased information security with reduced interference in the user's interactions with the information handling system. Nervous states transition an information handling system between full access and locked states so that sensitive information may be protected even while less sensitive functions of the system remain available. Sensors at the information handling system dynamically monitor user activity with power and privacy considerations so that the monitoring has minimal impact on system use. Nervous states are ultimately managed by the user with various authentication techniques available to transition from an automatically imposed nervous state based upon the context sensed at the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Access to information through an information handling system is selectively locked with predetermined conditions set based on sensed external conditions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
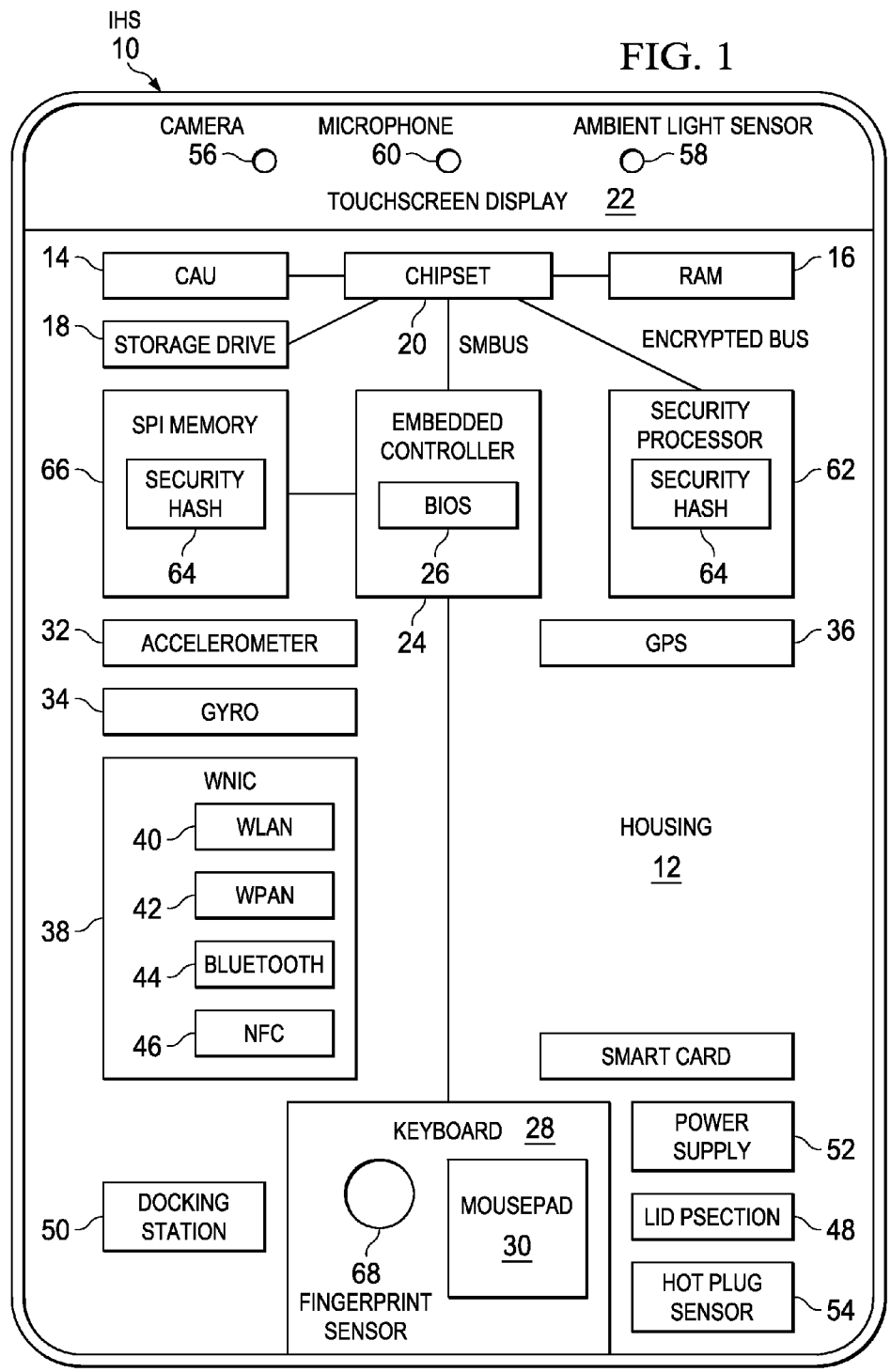
FIG. 1 depicts a block diagram of an information handling system having access to currently authorized secure information selectively locked with predetermined conditions set based on sensed external conditions.

Referring now to FIG. 1, a block diagram depicts an information handling system 10 having access to currently-authorized secure information selectively locked with predetermined conditions set based on sensed external conditions. Information handling system 10 processes information with plural components disposed in a housing 12. For instance, a central processor unit (CPU) 14 executes instructions to operate on information stored in random access memory (RAM) 16 and retrieved from non-volatile storage, such as a hard disk drive or solid state drive 18. A chipset 20 coordinates communication of information between components with firmware instructions executing on a variety of processors, such as a memory hub, and coordinates interaction with end users, such as by presenting information as visual images at a display 22 and accepting inputs made at a touchscreen integrated in display 22. An embedded controller 24 executes firmware to coordinate interactions between CPU 14 and input/output (I/O) devices, such as with a Basic Input/Output System (BIOS) 26. For example, end users interact with applications executing on CPU 14 by making inputs through a keyboard 28 and a mousepad 30 that are managed by firmware on embedded controller 24. Chipset 20 and embedded controller 24 under the management of BIOS 26 support interactions with a variety of integrated and peripheral devices and sensors, such as: an accelerometer 32 that detects accelerations; a gyro 34 that detects angular position; a GPS 36 that receives and analyzes global positioning information; a wireless network interface card (WNIC) 38 that provides wireless networking with local area network 40, personal area network 42, Bluetooth 44, near field communication (NFC) 46 and other wireless interfaces; a lid position sensor 48 that detects the position of display 22 relative to housing 12 in a clamshell-configured system; a docking station manager 50 that detects coupling to a docking station; a power supply that detects coupling to an external power adapter; a hot plug sensor 54 that detects a hot plug event, such as a peripheral device that interfaces with a peripheral port; a camera 56 that captures images proximate display 22; an ambient light sensor 58 that measures ambient light for adjusting brightness at display 22; and a microphone 60 that captures audible sounds. In alternative embodiments, other types of sensors may be included specifically for purposes of security, such as proximity sensors that detect an end user's proximity by touch or other indications, such as capacitive or infrared based sensors.

Information handling system 10 includes a security processor 62 that monitors activity associated with information handling system 10 to detect and stop unauthorized interactions. For example, security processor 62 maintains a secure USB interface with chipset 20 using a security hash 64 shared with chipset 20, such as by storage on SPI memory 66 interfaced with embedded controller 24. The secure hash is established at startup, such as with a random number generation, so that security operations performed at secure processor 62 are physically protected with a trusted hardware infrastructure within information handling system 10. Security processor 62 enhances password and other security measures that protect information handling system from unauthorized access by preventing remote access and maintaining security measures in a control vault that is less vulnerable to malicious attack. Security processor 62 manages password accesses, such as passwords that provide lock and unlock functions through an operating system, and manages other security devices, such as authentication with a fingerprint sensor 68, facial recognition with camera 56 and other biometric security measures. Information handling system 10 as depicted by FIG. 1 is an example of hardware components used in the security system described herein. In alternative embodiments, different hardware components and security measures may be included or removed from the example. For example, less power full information handling system 10 may lack various sensor capabilities or the processing capacity needed to perform more complex security operations, such as facial recognition.

Figure 2:
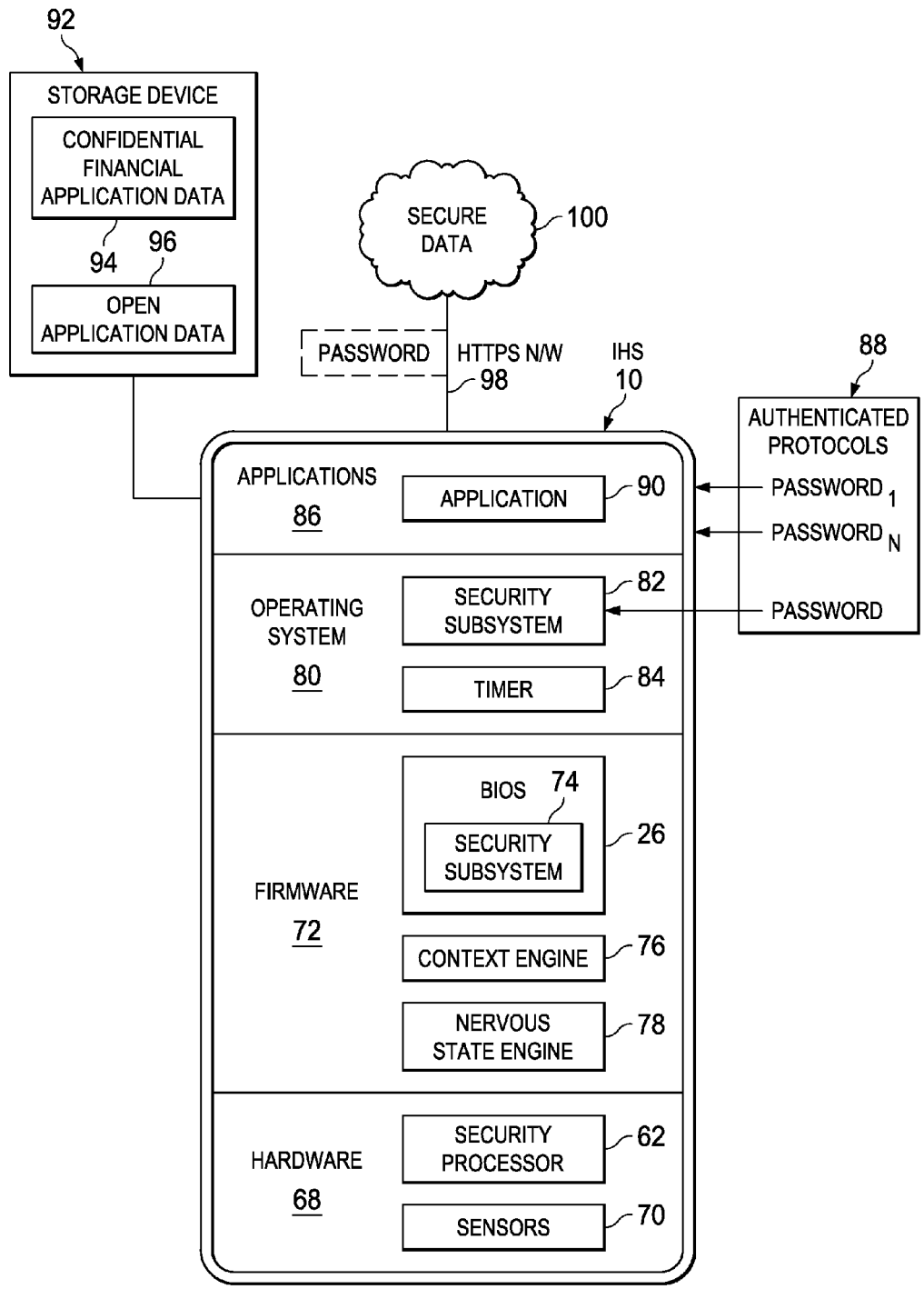
FIG. 2 depicts a block diagram of software, firmware and hardware layers with selective locking of currently authorized secure information with predetermined conditions set based on sensed external conditions.

Referring now to FIG. 2, a block diagram depicts software, firmware and hardware layers with selective locking of currently authorized secure information with predetermined conditions set based on sensed external conditions. Hardware layer 68 provides hardware resources to execute instructions and store information. Sensors 70 generally include hardware devices that detect an external condition, such as touching by an end user, visual light, and RF signals. Security processor 62 executes instructions in a secure environment to reduce the risk of malicious interference with security operations, such as by obtaining sensed conditions in an encrypted format. Firmware layer 72 provides instructions stored in non-volatile memory, such as flash memory, that execute on processors within hardware layer 68. BIOS 26, for example, executes on embedded controller 24 to coordinate communications between hardware layer 68 and operating system layer 80. A security subsystem 74 is embedded as part of BIOS 26 or other firmware elements to coordinate security operations between hardware layer 68 and a security subsystem 82 of operating system layer 80. For example, a security subsystem 82 within WINDOWS operating systems typically includes a timer 84 that locks access to the operating system after a predetermined timeout period, such as fifteen minutes.

Firmware layer 72 includes a context engine 76 and a nervous state engine 78 that cooperate to enhance security of information handling system 10 by adjusting the conditions that restrict access to information after the information handling system is unlocked. Context engine 76 analyzes external conditions sensed by sensors 70 to generate a context of the conditions under which the information handling system is operating. Nervous state engine 78 applies the context to establish and enforce conditions at which access to information through the information handling system is locked or partially locked. In the example embodiment, context engine 76 and nervous state engine 78 execute on security processor 62; however, in alternative embodiments, context engine 76 and nervous state engine 78 may execute as software or firmware on one or more other processing components.

An application layer 86 executes over operating system layer 80 and provides an end user with access to confidential information through a number of different authentication protocols 88. One example of an authentication protocol 88 is the WINDOWS operating system password that locks and unlocks access to an information handling system in general. Other types of authentication protocols 88 lock and unlock access to an application 90, such as a financial application, to a storage device 92, such as an internal or external hard disk drive, to a particular confidential file 94, such as a financial file which might be stored along with open application data 96 that is not password protected, or to a network interface 98 that communicates with a secure data network location 100. Context engine 76 and nervous state engine 78 cooperate to selectively lock access to information handling system 10 and/or specific applications or files based upon the context sensed by sensors 70 as set forth below. The conditions that initiate a lock of an unlocked authentication protocol 88 change based upon context determined by context engine 76 from conditions sensed by sensors 70.

As depicted by FIG. 1, a wide variety of sensors may be monitored by context engine 76 and nervous state engine 78. Many information handling system components that perform functions may provide sensing of external conditions as a secondary function, such as normal I/O devices that detect touch, like keyboard 28 and mousepad 30. Sensors monitor the context around a user and an information handling system to define and detect contexts and enable nervous behavior in response to changes in context. Microphone 60 provides voice recognition, ambient sound recognition and command recognition. Detected sounds are used in a passive manner for recognizing a context and thus establishing a nervous state. Camera 56 provides ambient light condition sensing, clear vision detection to ensure a camera is not covered, face recognition, person awareness that indicates a presence of a person, and wrong identification of an unknown person. As with microphone 60, camera 56 is used in a passive manner for recognizing a context and thus establishing a nervous state. Ambient light sensor 58 senses ambient light for reconciliation with camera sensing to detect tampering with camera 56. GPS receiver 36 detects position to compare with known safe and unsafe positions and to detect impossible or improbable movements when location changes rapidly. Gyroscope 34 and accelerometer 32 detect expected versus unexpected or non-normal behavior, such as heavy jostling as might occur when a device is pulled away in an unauthorized manner. Context engine 76 and nervous state engine 78 may also use network devices as RF sensors to detect a context and establish a nervous state. WLAN 40 provides an SSID name that allows a positional determination and supports a security beacon in the event of a theft. WPAN 42 and Bluetooth 44 provide user specific information, such as detection of a user's smartphone within a short distance, detection of peripheral devices associated with position, and detection of unknown devices within a short distance for an extended time, indicating potential continuous presence of an unauthorized individual. Other types of sensors that provide context, such as positional information, include a power supply identifier, a docking station identifier, a hot plug sensor detect, a smartcard reader, a lid position indicator, etc.

Figure 3:
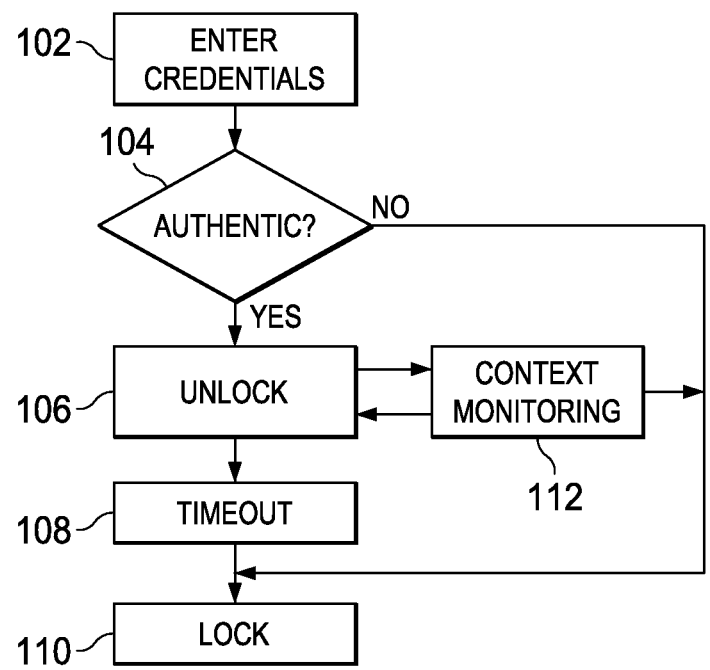
FIG. 3 depicts a flow diagram of a process for locking access to an unlocked information handling system with predetermined conditions based upon sensed context.

Referring now to FIG. 3, a flow diagram depicts a process for locking access to an unlocked information handling system with predetermined conditions based upon sensed context. The process starts at step 102 with entry of credentials to authenticate an end user. Credentials may include a password, biometrics or other authentication protocol that allow access to all or a portion of the information and/or functions available through the information handling system. At step 104 a determination is made of whether the credentials authentic the end user to access the information handling system. If authentication is provided, the process continues to step 106 to unlock access to the information handling system according to the authentication for a predetermined timeout at step 108, after which the information handling system locks at step 110. If authentication is not provided at step 104, the process continues to 110 to lock the information handling system. Authentication, unlocking and locking at the information handling system take place in a conventional manner.

At step 112, context monitoring is provided at the information handling system to selectively adjust the conditions under which the information handling system locks at step 110. Context monitoring at step 112 detects changes in context at the information handling system based upon sensed external conditions so that the unlocked state set at step 106 is selectively adjusted by transitioning to a locked state at step 110 or by altering timeout conditions at step 108. Context monitoring in one embodiment is authentication protocol specific so that each context change may have individualized impact on access provided by each authentication protocol. For example, a change in context might have no impact on the timeout to lock the operating system and/or BIOS security subsystem, but shorten the lockout for information accessed through a virtual private network (VPN) while locking access to personal financial information through a web browser HTTPS interface with a personal financial account web site. Context monitoring establishes context from stored relationships if available, or initiates context monitoring in new conditions if sensed conditions are not recognized. For example, if a WLAN interface is unfamiliar, an initial context is established and then adjusted as additional information becomes available from sensors, such as changes is lighting conditions, background noise and received Bluetooth devices.

Figure 4:
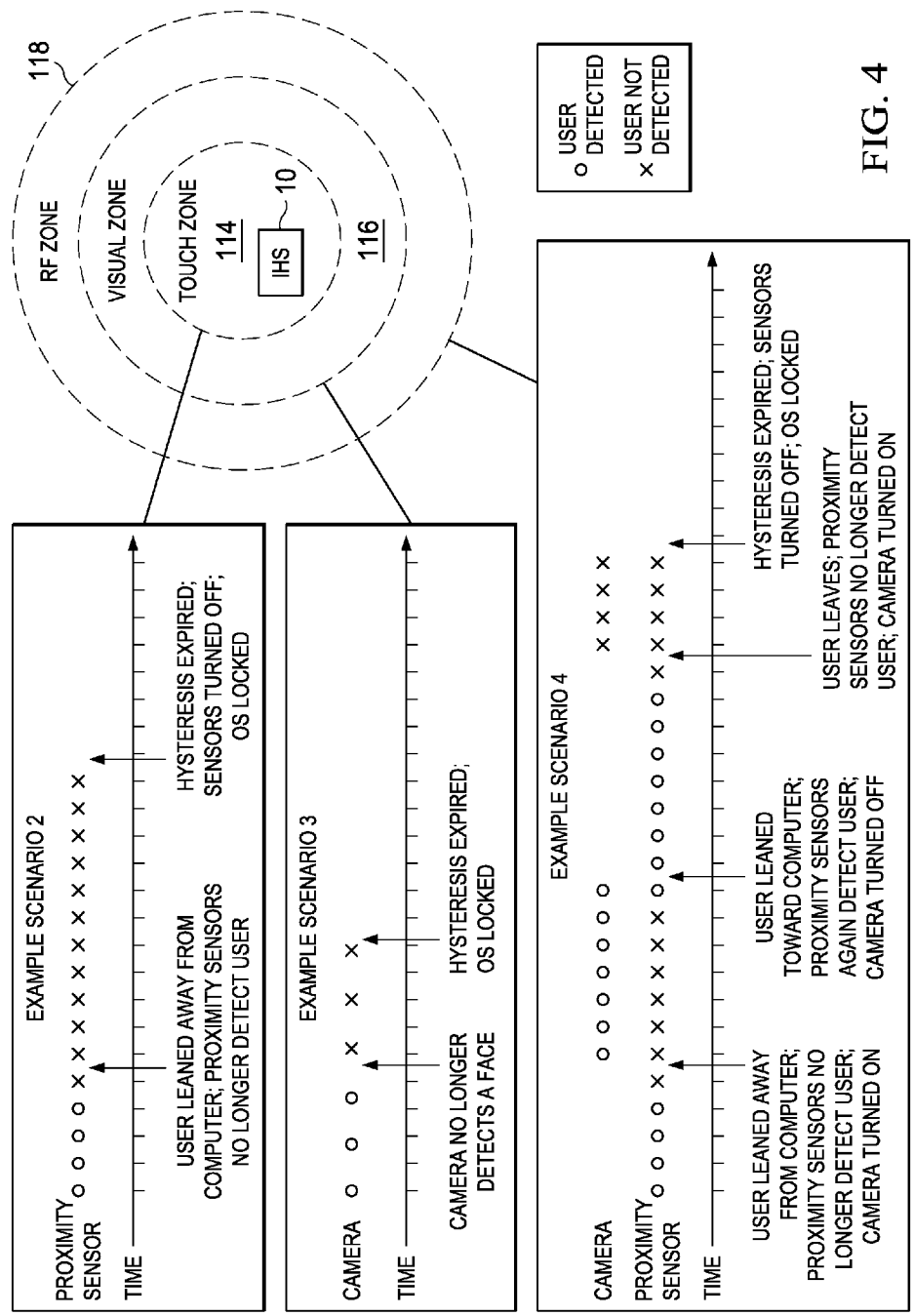
FIG. 4 depicts an example of work area sensor interactions that depict how context awareness adjusts to changes is sensed conditions.

Referring now to FIG. 4, an example of work area sensor interactions depict how context awareness adjusts to changes is sensed conditions. Within a touch zone 114, user activity is detected by inputs through I/O devices, such as a keyboard or mouse. Monitoring with touch zone 114 imposes minimal energy consumption and applies a timeout to lock access to information after a predetermined time. In one embodiment, each authentication protocol applies its own timeout. For instance, an extended timeout used for multimedia information allows a movie to continue presentation by an end user for an extend time while secure browser interfaces are locked with a separate timeout. Monitoring visual zone 116 increases power consumption if a camera is powered up, such as after a failure to detect touching for a predetermined time period. In order to preserve power consumption, in one example embodiment, only zone is monitored at a time. Thus, for instance, after a predetermined time period without detection of touches, context monitoring transitions from touch zone 114 to visual zone 116 by powering up camera 56 and capturing an image proximate information handling system 10. As long as an image of a face is detected, timeout does not advance, however, if camera 56 fails to detect a face, timeout to a lock is initiated. Alternatively, a transition is made from visual zone 116 to an RF zone 118 so that RF signals associated with an end user are detected, such as smartphone or tablet Bluetooth signal. If RF signals are not detected, then a timeout initiates. In one embodiment, if both visual and RF signals are available, RF signals may be chosen for monitoring in order to reduce power consumption by camera 56. In another alternative embodiment, context is analyzed to determine whether to monitor with one or more than one sensor. For example, if a safe context is detected, power might be saved by relying on one sensor, while an unfamiliar context may result in context monitoring by additional sensors.

Figure 5:
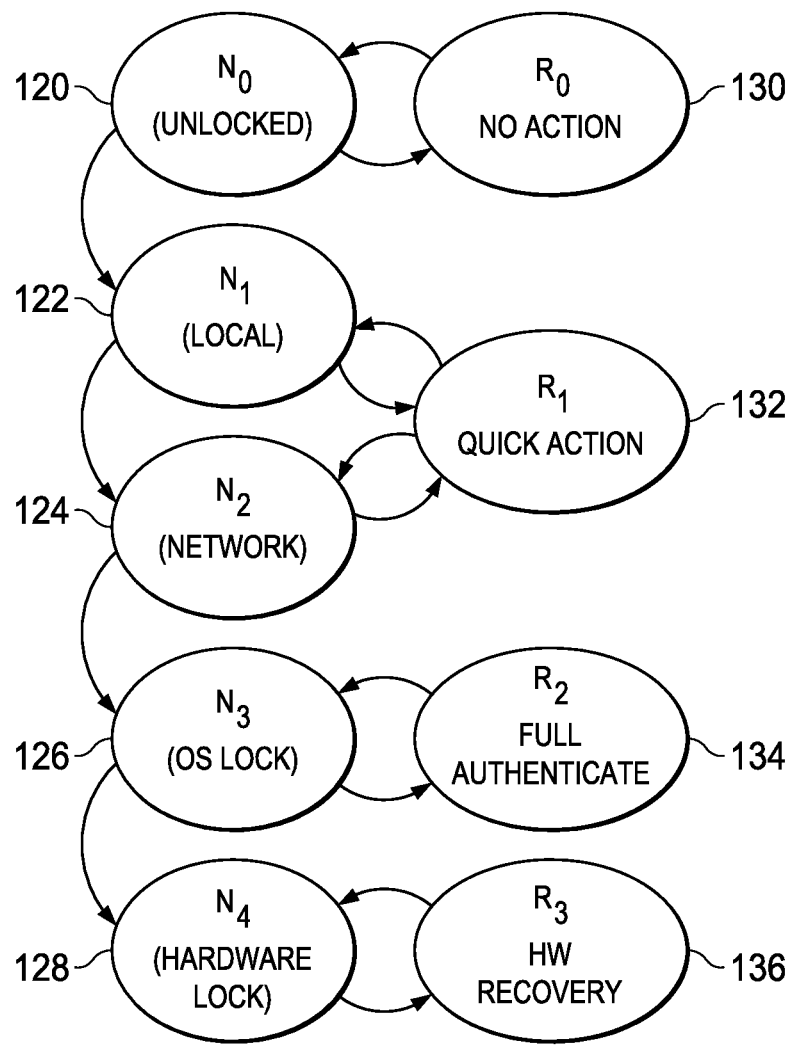
FIG. 5 depicts a state diagram depicts an example of transitions between nervous states based upon sensed context at an information handling system.

Referring now to FIG. 5, a state diagram depicts an example of transitions between nervous states based upon sensed context at an information handling system. At nervous state 120, a full system unlock is accomplished to provide a user with access to information through the information handling system. The system unlock may be a single password or single biometric authentication or multiple authentication protocols with each protocol for access to specific functions and information. At nervous state 122, privacy is enforced by purging sensitive information in memory, such as passwords and password protected information, and blanking the display to stop presentation of images. At nervous state 124, cloud and single sign-on applications are logged off. At nervous state 126, an operating system lock is enforced to lock all access to the information handling system. At nervous state 128, a hardware lock is enforced, such as due to a likely theft, with the hard disk drive wiped clean and a stolen beacon turned on. Although the nervous states are depicted as occurring in order, a context determination as set forth below may cause an out-of-order transition between nervous states. Recovery from each nervous state depends upon the security measures enforced at each nervous state. In the example embodiment, recovery state 130 requires no end user action and may return to the device and continue use as normal. Recovery state 132 requires a quick user action, such as entering a pin or other authentication credential in order to continue using the system. Recovery state 134 requires addition user inputs, such as full entry of user credentials and authentication protocols to access information at the previously used unlocked state. Recovery state 136 requires an offline restoration of information from a backup location. The examples below set forth various embodiments of nervous states, however, additional nervous states and recovery states may be added to those depicted by FIG. 5 as desired by an end user.

One example of a nervous state is a user-not-present nervous state with an unlocked access. If the context changes because a Bluetooth device leaves range of the information handling system, such as Bluetooth of a smartphone registered with the context engine of the information handling system, the nervous state 120 is entered having a predetermined timeout to lock. Context engine 76 can establish the Bluetooth device as associated with a user not present by monitoring camera images and Bluetooth reception over time to associate the user presence and the Bluetooth device. During the user-not-present state, polling of the Bluetooth device allows a transition to a user-present state if the Bluetooth is detected. The user-not-present state might also be entered if a camera has an image of the user at authentication and then the user leaves the view of the camera. The camera need not perform any identification functions or analysis and can poll for renewed user presence with periodic image sampling for a "blob" that appears. In one embodiment, the user not present context results in a nervous state that decreases time out to a locked state but does not actually lock any access if the context falls within a position on a "safe" list stored with the nervous state engine 78, such as based upon the SSID of a WLAN or a GPS position that indicates the user is at home or work. In an alternative embodiment, the user not present context results in a "more" nervous state that locks some or all access to information, such as if the information handling system is at an unknown or an unsafe position. In yet another example, the "more" nervous state sets transitions to additional nervous states so that a change in context results in a more rapid and extensive lock of access, such as an immediate lock enforced with an accelerometer or gyroscope detects motion of the information handling system.

Another example of a nervous state is an emergency state that transitions the information handling system to nervous state 124 with locked network access. An Emergency state is enforced if an accelerometer or gyroscope in the information handling system detects heavy jostling, such as readings or greater than an amount expected during normal use. For instance, fast movements and high accelerations that exceed a predetermined threshold might indicate a theft or a struggle for the information handling system. In one embodiment, entry to the emergency state resets the context so that a change in sensed conditions provides a more rapid transition to hardware lock state 128. For instance, from the emergency state a transition to hardware lock is enforced if a WLAN connection is lost, since the loss of WLAN connection indicates that the information handling system has made a change in position indicative of a theft. From the emergency state, recovery state 134 requires full authentication to resume information access.

Another example of a nervous state is a tampering state that enters nervous state 122 to purge sensitive data and block the screen with a recover state of 134 that requires complete authentication to access information. The context for the tampering state is a camera blocked to prevent capture of images and an ambient light sensor that captures light. Discrepancy between the light captured by the camera and ambient light sensors indicates that the camera's field of view has experienced interference indicative of an attempt to overcome camera-based security monitoring. The tampering state may also be enforced if a geo-location discontinuity is detected that indicates an improbable movement in an incorrect direction. A geo-boundary is defined so that the tampering state is not enforced unless the information handling system exits the boundary. In one embodiment, a GPS position is logged when an end user logs into the information handling system with authentication so that the boundary is based upon the location at login. The GPS position that determines the boundary may be adjusted with periodic polling to adapt to changes in position by the user. For example, updated GPS positions may be used if a context exists that verifies the presence of the user at the updated position, such as Bluetooth interface with a smartphone of the user. In other words, the nervous state based upon GPS position adjusts by the context established with other sensors at the time of the GPS measurement that defines a geo-boundary.

Another example of a nervous state is a wrong user present state in which the presence of a user is confirmed as other than the end user who has entered credentials for access at the information handling system. The nervous state for wrong user present is 126, which enforces a system lock and a recovery state of 134 that requires full authentication. One context that establishes wrong user present is a camera image identification of a non-enrolled face. Another example is that a fingerprint continuous authentication device measures a non-enrolled person at the device. In one alternative embodiment, the nervous state for wrong person present may differ based upon the context sensed when the wrong person is present. For example, in a safe location as determined by a GPS measurement of WLAN SSID, the wrong person may very well have authorization for limited access to the information handling system, such as an information technology administrator in an enterprise building. Thus, the wrong person present state in a safe location may continue to allow access to enterprise information but lock access to personal information, such as personal financial information stored locally or access through a secure website. In an unsafe or unknown location, the wrong person present may immediately lock the system and set the context so that detection of an acceleration at the information handling system will set off a stolen beacon. End users and enterprises may set nervous states to balance security of information with the potential inconvenience to an end user if access is locked too frequently.

Another example of a nervous state is an SSID name change state, which enforces nervous state 124 and requires recovery 134. The context engine establishes the context of the SSID at authentication by an end user and stores the SSID. If the SSID changes, the nervous state engine locks access to network interfaces at the information handling system until the end user provides authentication for the network interfaces. In alternative embodiments, the nervous state enforced by an SSID change may vary based upon other detected context, such as geoposition or inclusion of the new SSID on a "safe" list. Alternatively, change in SSID to a "safe" SSID might enforce a nervous state transition to lock access only to personal information and not enterprise information. In one example embodiment, an SSID unknown state is enforced if all SSIDs detected by a WNIC of an information handling system are not listed as "safe" SSIDs. SSID names are grouped and cached securely, such as in firmware of a security processor, and compared against detected SSIDs to determine a position of the information handling system. In an alternative embodiment, all SSIDs detected at a user login are cached as "known" so that the user session remains open unless all SSIDs become unknown, which indicates movement of the information handling system to a new location.

Another example of a nervous state is a continuous idle state with a nervous state of 124 and a recovery state of 134. The continuous idle state prevents a malicious user from maintaining access to information by keeping an authenticated session open with frequent non-meaningful inputs, such as mouse touches. The continuous idle state in one embodiment allows an end user to continue watching a multimedia presentation, such as a movie, but locks other accesses at the information handling system. The continuous idle state may be entered after an extended time period of watching a multimedia presentation or after a predetermined number of non-meaningful inputs, such as mouse touches made just to keep a session alive. The continuous idle state may be used as an end result for other states that lock access if the system is presenting multimedia information.

As describe above, nervous state transitions are managed by monitoring context determined from sensed external conditions. In various embodiments, various nervous states may be chained together based upon detected changes to context in order to mimic likely use cases of a legitimate user of an information handling system. For example, the user not present state above may be chained to various device interaction states to selectively lock access to the information handling system. Some sensed conditions that indicate a change in context when in the user not present state include: a lid position change; a docking station change; an SSID name change; a GPS location change; a power adapter change, such as new power adapter ID, a known power adapter ID or a coupling/decoupling of a power adapter; a human interface device change; a hot plug status change that indicates a hot plug device interface, such as a USB key coupled to a USB port; and an accelerometer change. In each case, the context determines the transition to the next nervous state, which determine the conditions under which selected of the access of an unlocked system are locked. Similarly, a nervous state with a user present may have a shorter timeout than a nervous state that detects a known user present, and detection of an unknown user, such as an image captured by a camera that is not a known user, can initiate a more sensitive nervous state to lock all or part of a system. For instance, an unknown person nervous state can have a relatively short timeout to blank presentation of a display based upon the amount of time that the unknown user is in view of the camera, such as might be predictive of the unknown user reading the display versus just passing by.

Figure 6:
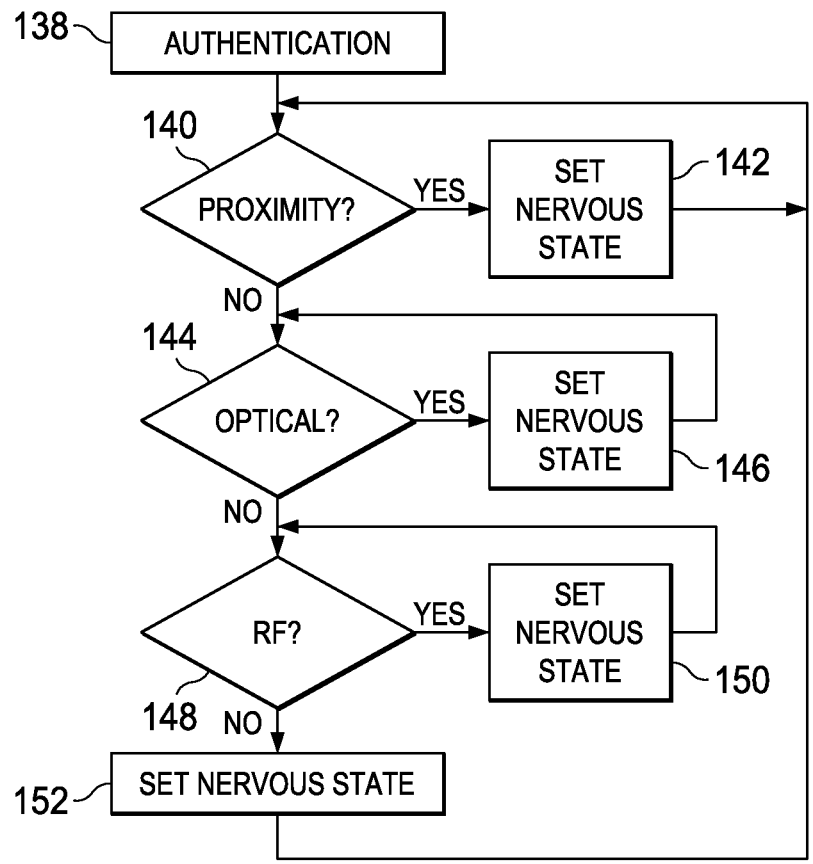
FIG. 6 depicts a flow diagram of a process for establishing nervous states based upon the context detected at an information handling system.

Referring now to FIG. 6, a flow diagram depicts a process for establishing nervous states based upon the context detected at an information handling system. The process begins at step 138 with authentication input at the information handling system. A context is established at the time of authentication based upon sensed external conditions, which may initiate a nervous state if the sensed external conditions match stored conditions. Alternatively, the context engine may start from scratch and store a context built from sensed external conditions and the user's interaction with the information handling system. Once the nervous state is established, the process continues to step 140 to determine if a proximity sensor detects an end user interaction, such as with a keyboard or mouse input. If so, the process continues to step 142 to set a nervous state based upon the detected external condition and other sensed external conditions as set forth in FIG. 7. If at step 140 no proximity sensor input is detected, such as for predetermined time period, then the process continues to step 144 to determine if a sensed optical condition exists, such as an image captured with an individual or an identified image with a known or unknown individual. If a sensed optical condition exists, the process continues to step 146 to establish a nervous state based on the sensed condition and other sensed conditions. From step 146, monitoring continues at step 144 to determine if the optical condition changes. In one embodiment, monitoring by one sensor continues as long as the condition sensed by the sensor does not change. In an alternative embodiment, monitoring may also include other sensed conditions, such by returning to step 140. If at step 144 the optical condition is not detected, the process continues to step 148 to determine if an RF condition exists, such as an interface with or detection of an external RF device. If an RF device is detected, such as a WLAN, WPAN or Bluetooth device, then the process continues to step 150 to set the nervous state based upon the detected condition. From step 150, monitoring may continue to focus just on the RF device to detect a change in the condition or, alternatively, may include proximity and/or optical sensing devices. If at step 148 an RF device is not detected, then the process continues to step 152 to set a nervous state based upon the lack of a user-associated sensed condition. From step 152, monitoring for user-associated conditions may continue until the system meets the condition of the nervous state that causes the information handling system to lock access. In one alternative embodiment, monitoring is performed cumulatively so that only proximity sensors are used until proximity is no longer sensed, then proximity and optical sensors are used until both proximity and optical conditions are no longer sensed, then proximity, optical and RF sensors are monitored. If proximity is sensed when also monitoring optical and RF, then optical and RF sensing may be ceased. If optical is sensed when RF is monitored then RF sensing may be ceased. In various embodiments various alternative monitoring may be used to balance security and power consumption based upon the context sensed at the information handling system. Each type of sensing may have a different timeout period assigned for system lockout. For example, when monitoring with proximity, a 15 minute timeout may apply, while a 10 minute timeout may apply with optical sensing and a 5 minute timeout with RF sensing.

Figure 7:
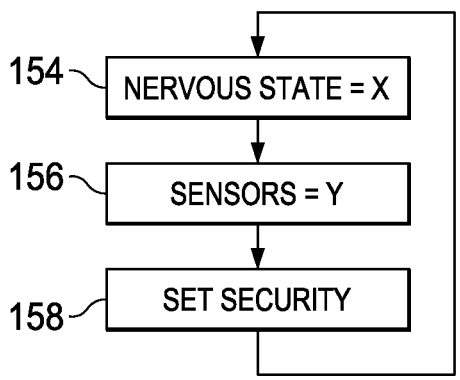
FIG. 7 depicts a flow diagram of a process of selectively locking access to information at an information handling system based upon the context detected at the information handling system.

Referring now to FIG. 7, a flow diagram depicts a process of selectively locking access to information at an information handling system based upon the context detected at the information handling system. The process starts at step 154 by determining the current nervous state of the information handling system. The nervous state is initially set upon login or other authentication based upon an initial context as determined from sensed external conditions and then maintained until a condition is met to lock the information handling system or a condition is detected to change the nervous state. At step 156, the current nervous state is analyzed relative to external conditions sensed by the sensors, such a proximity, visual and RF sensors. At step 158, access to the information handling system is selectively locked according to the nervous state and sensed conditions. The process then repeats until the system completely locks. The security setting at step 158 can result in the locking of access to specific information, such as finances, specific websites, such as financial websites, specific protocols, such as HTTPS, specific applications, or whatever degree of granularity is desired by the end user. As an example, a user not present state can selectively enforce different securities based upon sensed position provided by a WLAN SSID, a GPS position, a power adapter or docking station identifier, etc. Some example scenarios of selectively locking access at an information handling system as presented below aid in the understanding of the present disclosure without intending to limit the scope of the invention.

In a coffee shop scenario, an enterprise employee works from a coffee shop using a WiFi hotspot. The employee completely unlocks his information handling system with a SSO password that gives full access to all password protected information and applications, including a VPN connection to enterprise and private financial information and work documents, plus personal social media websites. The employee walks to the counter to pick up a drink order and in the few seconds that the employee is gone, a thief walks off with his information handling system and out the store exit. Because the information handling system context engine developed a public location context, the nervous state engine placed the system in a nervous state having a more rapid timeout in the event that the employee leaves the immediate area of the information handling system. For example, an AT&T hotspot SSID initiates the context engine to a public location context, under which the nervous state engine actively monitors for employee presences with touch, camera and RF sensors, and nearly-immediately alters access if presence is lost by blanking the screen for privacy without changing an unlocked state. As soon as the camera loses site of an end user "blob" the nervous state engine blanks the screen for privacy and enhances the sensitivity of accelerations sensed by the accelerometer so that picking up the information handling system by the thief causes the system to transition to a locked nervous state. In addition, the timeout from the locked state to a hardware lock is reduced so that relatively small accelerations felt by the information handling system for a relatively short timeout will secure enterprise and personal information.

In the same coffee shop scenario, the enterprise-assigned smartphone is registered to the context engine so that the users range may be estimated based upon signal strength received from the smartphone at the information handling system. The context engine detects a public context as above but assigns a less "nervous" state as long as the Bluetooth device remains within a predetermined range. If the range becomes greater than a threshold or if the Bluetooth communication is lost, then the nervous state engine transitions to the nervous state describe above. While Bluetooth communication remains established, the nervous state engine selectively locks access to financial information so that the user realizes minimum inconvenience when he returns to the system. In an alternative embodiment, loss of Bluetooth communication locks access to financial information and the return of Bluetooth communication restores access without input of authentication information.

Again, in the same coffee shop scenario, the user leaves the immediate presence of the information handling system and the change in context is detected by lack of a user in the camera and lack of Bluetooth. The nervous state engine automatically secures financial information and shortens the timeout to a system lock. A thief sees the open information handling system and introduces a thumb drive to copy information from the system. The nervous state engine responds to the condition of a hot plug detect in the user absent nervous state by immediately locking the system and requiring full authentication to access information. The nervous state engine also responds to decoupling of a power adapter from the information handling system or an external power source by immediately locking the information handling system.

In another embodiment with the coffee shop scenario, the context engine detects a public location with GPS and/or SSID of a WLAN and places the information handling system in a public location nervous state. A user absence is detected with a lack of touch for a 15 minute period because the user is watching a movie. The nervous state engine locks access to the information handling system but allows playing of the movie to continue. The context engine then detects user absence with a loss of Bluetooth signal from the user's phone. In fact, a thief stole the information handling system from the nearby user who was not paying attention. In response to the change in context, the nervous state engine makes an interface with the SSID a condition of continued operation at the information handling system. When the WLAN interface with the SSID is lost, the system goes to hardware lock. The condition for continued interface with the WLAN SSID prevents an end user from stealing the system and attempting to keep authentication alive by making meaningless inputs every 15 minutes.

In a different scenario, an operating system local privilege selectively locks access with real-time user recognition. A user in a home office authenticates to unlock all resources, including access to enterprise and personal financial information. The context engine detects a home office context from the home office WLAN SSID and sets a "safe" nervous state. The user leaves the information handling system to attend to kitchen tasks and the context engine, sensing a lack of touch and the presence of external power, commands monitoring by the system camera in a user absent nervous state. The camera captures an image of the user's child and recognizes the child as a different user than the authenticated user. In response, the nervous state engine locks access to enterprise and personal financial information but allows access to non-sensitive applications, such as a web browser to search for television shows or a child's game. In addition, the nervous state engine locks access to communication applications, such as email or telephone communications. In summary, currently available access is selectively locked by closing HTTPS sessions, locking a password manager, locking encrypted containers and locked selected applications, while less sensitive accesses remain open.

In another scenario, a tiered response to context based confidence reductions is performed. A user in an enterprise cubicle unlocks access to an information handling system and then steps away from the cubicle. After lack of touch for a 15 second interval, the nervous state transitions to optical monitoring with a camera and initiates a "step away presence detection timer" to blank the display after two minutes pass. After two minutes pass, the screen blanks and the nervous state engine transitions to a nervous state with reduced confidence in the security of the system. For example, the nervous state transitions to assume that sensed external conditions of system movement have an increased risk of a system theft. Thus, an operating system lock will enforce if a lid change occurs, an acceleration is detected, a dock change occurs, an SSID name change occurs, network connectivity changes, GPS location changes by a predetermined amount, external power status changes, a hot plug event occurs, or I/O device interfaces change. If the user returns, the system remains unlocked for a timeout period so that minimal interference is imposed on the user; however, if anyone other than the user attempts to move the system, then full authentication is required for access. Thus, for example, if an IT administrator takes the system to perform maintenance, locking access to require a complete authentication will close HTTPS interfaces so that the IT administrator will not be able to access open personal financial information of the user by entering an IT password to access the system.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processing components disposed in the housing and operable to cooperate to process information;
   one or more input/output (I/O) devices interfaced with the processing components and operable to accept touch inputs;
   a display interfaced with the processing components and operable to present information as visual images;
   one or more optical sensors operable to sense light for adapting brightness of the display;
   one or more cameras operable to capture images proximate the display;
   one or more wireless communication devices operable to communicate with wireless signals; and
   a nervous state engine operable to execute on one or more of the processing components, the nervous state engine transitioning between plural nervous states, each nervous state disenabling access to currently authorized secure information with predetermined conditions defined by each nervous state, the nervous state engine transitioning between nervous states based upon a context sensed by one or more of the I/O devices, optical sensors, camera and wireless communication devices;
   wherein the nervous states include at least a first user-present nervous state that transitions to a second user-absent nervous state, the first user-present nervous state having one or more indications that an authorized user is proximate the information handling system, the first user-present nervous state disenabling a first access if a first predetermined condition is detected, the second user-absent nervous state having one or more indications that an authorized user is not proximate the information handling system, the second user-absent state disenabling a second access if the first predetermined condition is detected; and
   wherein the predetermined condition comprises a detection of discontinuity between the amount of light sensed by the one or more optical sensors and the one or more cameras, the second access comprising a complete lock of the information handling system.

2. The information handling system of claim 1 wherein the plural nervous states comprise a user absent nervous state having predetermined conditions of at least a lack of touch to the one or more I/O devices for a predetermined time, a lack of an image captured by the one or more optical sensors for a predetermined time and a lack of a wireless signal associated with the user, the nervous state engine disenabling all access to currently authorized secure information in response to the user absent state.

3. The information handling system of claim 1 wherein the plural nervous states comprise a user absent nervous state having predetermined conditions of at least a lack of an image captured by the one or more optical sensors, the nervous state engine immediately disenabling all access to currently authorized secure information in response to an acceleration detected by the information handling system when in the user absent nervous state.

4. The information handling system of claim 1 wherein the plural nervous states comprise a geographic state having predetermined conditions of at least a first wireless network detected followed by a second wireless network detected, the first wireless network included on a network list, the second wireless network absent from the network list, the nervous state engine immediately disenabling all network password accesses in response to detection of the second wireless network.

5. The information handling system of claim 4 wherein the geographic state further comprises a GPS position measured with a GPS receiver disposed in the housing, the predetermined conditions including the second wireless network being located outside a GPS boundary, the nervous state engine not disenabling all network password accesses if the second wireless network is within the GPS boundary.

6. The information handling system of claim 1 wherein the plural nervous states comprise a user absent nervous state having predetermined conditions of at least failure to detect a touch input for a predetermined time and detection of a wireless personal area network associated with a predetermined user, the nervous state continuing to allow access to predetermined authorized information if a first input is detected and the personal area network is detected, and disenabling predetermined authorized information in response to the first input if the wireless personal area network not detected.

7. The information handling system of claim 6 wherein the first input is detection of an acceleration by an accelerometer disposed in the housing.

8. The information handling system of claim 1 further comprising a movie player operable to present a movie, the nervous state engine continuing to allow presenting of the movie after disenabling access to currently authorized secure information.

9. A method for monitoring access at an information handling system, the method comprising:
   authorizing access to information through the information handling system;
   monitoring the information handling system to deauthorize at least a portion of the access through the information handling system in the event of a first one or more predetermined conditions;
   detecting with a sensor integrated in the information handling system at least a first sensed condition indicating absence of the user from a predetermined proximity with the information handling system; and
   in response to the detecting, altering the monitoring to deauthorize all access through the information handling system in the event of a detection of hot plug event at a port of an information handling system, the hot plug event associated with insertion of a portable storage device into the port.

10. The method of claim 9 wherein detecting with a sensor integrated in the information handling system at least a first sensed condition indicating absence of a user from a predetermined proximity with the information handling system further comprises:
    deauthorizing at least a portion of the access after a predetermined time elapses at a timer without a user input;
    sensing with a camera that captures images proximate the information handling system the lack of an end user in the image.

11. The method of claim 10 wherein the deauthorizing further comprises deauthorizing access to all password protected information.

12. The method of claim 11 wherein multimedia information currently presented at the information handling system continues being presented after the predetermined time.

13. The method of claim 9 wherein:
the at least a portion of the access deauthorized in the event of the first one or more predetermined conditions comprises access to network-based information; and
the at least a portion of the access deauthorized in the event of the second one or more predetermined conditions comprises access to locally-stored information.

14. The method of claim 13 wherein the sensor comprises a position sensor, the first one or more predetermined conditions comprise a first position and the second one or more predetermined conditions comprise a second position.

15. The method of claim 13 wherein the sensor comprises an RF sensor that senses a wireless interface.

16. A system for monitoring access to an information handling system, the system comprising:
plural sensors including at least an ambient light sensor for adjusting a display brightness and a camera for capturing images proximate the display, each sensor operable to sense one or more predetermined conditions at the information handling system; and
non-transitory memory storing a nervous state engine, the nervous state engine operable to execute on one or more of processing components disposed in the information handling system, the nervous state engine transitioning between plural nervous states, each nervous state disenabling access to at least a portion of currently authorized information upon detection of predetermined conditions defined by each nervous state, the nervous state engine transitioning between nervous states based upon a context sensed by one or more of the plural sensors;
wherein a first nervous state disenables a first access in response to a first predetermined condition sensed by the plural sensors and a second nervous state disenables all access in response to detection of discontinuity between the amount of light sensed by the ambient light sensor and the camera, the second nervous state entered upon detection of a user absence from a proximity of the information handling system.

17. The system of claim 16 wherein the nervous state engine transitions between first and second nervous states based upon an image sensed by a camera sensor integrated in the information handling system and disenables access in only one of the first and second nervous states based upon an acceleration detected by an accelerometer sensor integrated in the information handling system.

18. The system of claim 16 wherein the nervous state engine transitions between nervous states based upon an RF signal sensed by a wireless interface device integrated in the information handling system and disenables access in a first nervous state but not a second nervous state based upon an acceleration detected by an accelerometer sensor integrated in the information handling system.

19. The system of claim 18 wherein the RF signal comprises a Bluetooth signal from a predetermined device, the nervous state engine disenabling access if the acceleration is detected and the RF signal from the predetermined device is not detected.

20. The system of claim 18 wherein the RF signal comprises a wireless local area network, the nervous state engine disenabling access if the acceleration is detected unless the wireless local area network is on a safe list of wireless local area networks stored on the information handling system.

* * * * *